Patented Mar. 28, 1939

2,151,697

UNITED STATES PATENT OFFICE 2,151,697

PREGNANCY ANTIGEN

Benjamin Gruskin, Philadelphia, Pa., assignor to Lakeland Foundation, Chicago, Ill., a corporation of Illinois No Drawing. Application April 29, 1936, Serial No. 76,874

10 Claims. (Cl. 167—78)

This invention relates to a substance commonly referred to as antigen, and relates to an antigen for the determination of pregnancy.

This application relates to certain improvements over applicant's co-pending application, Serial No. 731,117, filed June 18, 1934, which has matured into United States Patent No. 2,042,430, patented May 26, 1936.

The present invention relates more specifically to an antigen and test for determining pregnancy wherein the antigen is made solely from the foetal layer of the placenta whereby a strong pseudopodic skin reaction occurs when the antigen is injected intradermally in a pregnant mammalian, the purpose being primarily to provide an antigen which gives a strong and sharp reaction so that early and late pregnancy can be easily and accurately determined.

An important object of the present invention is to provide an antigen and test which is capable of accurately determining the fact of pregnancy at all times and even during menstruation.

Another object of the invention is to provide an antigen for the purpose of detecting whether or not pregnancy exists by the injection intradermally of an antigen which is made from the foetal layer of the placenta, particularly from the placenta from the mother giving birth to a female.

Numerous other objects and advantages will be apparent throughout the progress of the following specification.

The theory upon which the present invention and discovery is based, consists in the fact that the foetal layer of the placenta contains a characteristic protein specific to the embryonic foetal protein in the system of a pregnant mammalian, and that when an antigen is made up of an extract of the foetal layer of the placenta and introduced intradermally into a pregnant mammalian the characteristic protein will respond allergically and produce pseudopodia. Therefore, an antigen made up of foetal placenta introduced into the skin of a pregnant female will cause a pseudopodic formation to occur, this formation appearing about the margin of the wheal formed by the injection. When using the antigen made up by extracting tissue comprising the foetal layer of a mammalian placenta, which tissue is free of any part of the maternal layer, it has been found that new and valuable results are obtained. Thus, an antigen prepared in accordance with the present invention will accurately determine the fact of pregnancy during menstruation. It is known, in accordance with medical science, that menstruation sometimes occurs during pregnancy and it is at such times that a diagnosis disclosing the fact of pregnancy is of great importance. When using an antigen extracted from both the maternal and the foetal layers of the placenta, in accordance with one specific aspect of my invention disclosed and claimed broadly in my U. S. patent No. 2,042,430, the test is contra-indicated during menstruation, because of the decidual involvement of that process which will respond to the homologous protein of the placenta extract giving positive reactions. I have now discovered that the antigen produced from the foetal layer only is free from any homologous protein which will cause a false reaction at this time.

*The antigen*

Placentas are obtained from known healthy Wasserman-negative human being patients. If the test is to be performed on animals, the placentas used are obtained from a characteristic mammalian. The placentas must be prepared within an hour after delivery, unless they can be frozen until used. The object of this is to prevent autolysis occurring in the cells of the placenta.

The placenta is washed free of blood, the cord is cut off, and the amnionic sac cut away, and all loose tissue removed from the surface of the placenta. The placenta is then placed in a dish with a curved inner surface, such as a large evaporating dish, placing the foetal side of the placenta next to the dish. The placenta is then frozen, say overnight, in the dish. After the tissue is thoroughly frozen, the placenta is removed from the dish. The layer of amnionic tissue adhering to the foetal side of the placenta is carefully dissected off, and when this has been removed, with a sharp scalpel the foetal layer of the placenta is cut off to a depth of about one-half centimeter. The large blood vessels should not be included with the tissue to be used. After the foetal tissue has been cut off, it should be washed free of blood. This is most easily done by placing the tissue in a piece of bolting cloth, and washing the tissue in running water. After all traces of blood have been washed from the tissue, the tissue is placed in three volumes of acetone, which is poured off after two hours, a fresh quantity of acetone added, and the tissue allowed to remain in the acetone for twenty-four hours, after which time the acetone is discarded, and the tissue thoroughly dried.

The placenta as a whole may be used for antigen as disclosed in my aforesaid prior patent, or I may use the part of the placenta remaining after removing the amnionic tissue and removing the maternal layer to a depth of one-half centimeter, by grinding the tissue in a cone type grinder, washing it free of blood, and drying the tissue in acetone. However, it has been found that use of the foetal layer alone will eliminate the possibility of false positive reactions during menstruation in cases of endometritis, etc.

Very excellent results have been obtained by the use of the foetal layer of the placenta, and it has been found that other excellent and very sharp results are obtained in accordance with the present invention when the foetal layer of the placenta used is that obtained from the placenta of a born female.

The dried tissue from the foetal layer is then ground to a coarse powder, and is extracted with a one-tenth normal solution of sodium-hydroxide, in the proportion of 1.5 grams of dry tissue to 100 cc. of tenth normal sodium-hydroxide. The tissue is mixed thoroughly with the sodium-hydroxide in a mortar and rubbed up, and is then placed in a glass stoppered Pyrex cylinder. The solution is shaken several times during the day, so that the tissue will be thoroughly extracted, as the tissue has a tendency to settle to the bottom of the tube, and unless it is thoroughly shaken with the solution, complete extraction will not take place. The tissue and sodium-hydroxide solution are allowed to stand for twenty-four hours in the cylinder. After this time the extract is poured into Pyrex tubes and centrifuged for five minutes at speed nine (on an International centrifuge). The supernatant solution is then pipetted off into a Pyrex beaker and the remaining tissue is discarded. The solution is then neutralized to a pH of 6.9 with a solution of 0.05 normal HCl containing 2.27 grams of anhydrous $KH_2PO_4$ per liter. The solution used for neutralizing and comprising 0.05 normal HCl containing 2.27 grams of anhydrous $KH_2PO_4$ per liter is termed an acid and buffer solution.

The acid and buffer solution just described is added to the alkaline extract which has been pipetted off from the cells and measured. The acid and buffer solution should be added slowly and the solutions carefully stirred or gently agitated while the acid and buffer solution is being added. After the acid and buffer solution has been added in an amount equal to the alkaline extract of the tissue, a few more cubic centimeters of the acid and buffer solution may be required. The resultant solution should then be tested to see if the neutralization is nearing the end point. This testing should be repeated frequently to make sure that the nitration does not go past the end point, which is of a pH of 6.9 for this process. If the resultant solution is made too acid, the protein of the antigen will be precipitated. The antigen should be checked electrometrically or it may be checked against a standard solution of a pH of 6.9, using the spot plate method, with brom-thymol-blue as an indicator.

As a comparison standard for the pH determination when the spot plate method is used with brom-thymol-blue as the indicator, a solution of anhydrous $KH_2PO_4$ and $Na_2HPO_4$ is employed in the following proportions:

|  | Grams per liter |
|---|---|
| $KH_2PO_4$ | 9.078 |
| $Na_2HPO_4$ | 9.472 |

The amounts mixed for the pH standard are 4.9 cc. of $KH_2PO_4$ and 5.1 cc. of $Na_2HPO_4$ solution.

The antigens and control solutions must be kept in Pyrex containers, as other glass gives up alkalis to the solutions which changes the pH and makes the antigen unusable.

The neutralized antigen is placed in sterile Pyrex containers, with rubber stoppers which have been boiled for fifteen minutes to remove soluble impurities. A preservative of one part tricresol to two parts glycerin is then added to the antigen, two drops of the mixture to each five cc. of antigen, which is then thoroughly shaken, so that the preservative will be thoroughly in solution. The stoppers of the vials should be pierced with a needle, to permit the compressed air to escape from the vials. The antigen is then placed in the ice chest for twenty-four hours, after which a slight sediment is sometimes noticed. If there should be a slight sediment present, pipette off the antigen into a sterile vial, and recheck the pH of the solution. The antigen will have a slight colloidal opacity, but must be free from any precipitation.

Test

One-tenth of one cubic centimeter of the above antigen is drawn off into a small syringe to which there is attached a very fine short needle. The antigen is injected intradermally, after first sterilizing and treating the surface of the patient's skin and rendering it perfectly dry. The injection is performed by stretching the skin with one hand and injecting the antigen intradermally, the injection being made by the usual intradermal method. In positive cases, that is, in cases where the patient examined is pregnant, a slight area of reaction will be noticed surrounding the small bubble, termed a "wheal", which wheal occurs from the injection, and pseudopods will form. Pseudopods are radial elongations extending outwardly from the edges of the wheal. In negative cases, that is, in cases where the patient is not pregnant, no pseudopod formation will take place.

The above test is based on the fact that since the placenta is made up of the foetal layer, a protein characteristic of foetal embryonic character is partly absorbed into the system of the mother. When an extract is made up of the foetal layer of the placenta and this extract is injected intradermally, pseudopods will be formed because the specific foetal embryonic character of the antigen is homologous to the specific embryonic foetal protein of the mother, according to the laws of protein sensitization or allergy. The antigen is furthermore free from all proteins which would be homologous to any decidual involvement of the process of menstruation and, for this reason, the formation of pseudopods shall occur only if the patient is actually pregnant. At the same time, pseudopod formation will not occur if the patient is not pregnant regardless of the fact of menstruation.

One should be especially careful in performing the test on sensitive skins, as sometimes some skins will react to all proteins. This reaction may be checked by making an extract of amnionic tissue which contains the same amount of protein as in the original antigen, but is not capable of producing pseudopods in normal cases. When individuals react to this latter extract they should not be tested by the present method as their skins will probably react to any protein.

The finished antigen for the pregnancy test and the amnionic extract may be heated to a temperature of about eighty degrees centigrade for about ten minutes to destroy the hormones present.

The invention and discovery herein set forth designate to a high degree of certainty whether or not a female is pregnant. The particular antigen herein described is made from the foetal layer only of the placenta and particularly from the foetal layer of a placenta from a born female. The placenta is obtained from the mother preferably not later than one hour after birth, unless the same is frozen to prevent disintegration of the tissue cells, and while the exact method herein described is preferable, it is to be understood that various changes to a certain degree may be made without departing from the spirit of the invention or sacrificing any of its advantages, and the right is hereby reserved to make all such changes as fairly fall within the scope of the following claims.

The invention is hereby claimed as follows:

1. An antigen specific to the determination of pregnancy by intradermal injection comprising a neutralized, inorganic alkaline hydroxide extract of the foetal layer of placental tissue free from any portion of the maternal layer.

2. An antigen specific to the determination of pregnancy by intradermal injection comprising a neutralized, inorganic alkaline hydroxide extract of the foetal layer of placental tissue free from any portion of the maternal layer, said antigen having a pH of substantially 6.9.

3. An antigen specific to the determination of pregnancy by intradermal injection comprising a neutralized sodium hydroxide extract of the foetal layer of mammalian placental tissue free from any portion of the maternal layer.

4. An antigen specific to the determination of pregnancy by intradermal injection comprising a neutralized sodium hydroxide extract of the foetal layer of human placental tissue free from any portion of the maternal layer, said antigen having a pH of substantially 6.9.

5. The process of making an antigen for intradermal use to determine if pregnancy exists which consists in extracting the foetal layer of placental tissue free from any portion of the maternal layer with an inorganic alkaline hydroxide, separating the extract, and then neutralizing the extract.

6. The process of making an antigen for intradermal use to determine if pregnancy exists which consists in obtaining an inorganic alkaline extract of the foetal layer of placental tissue free from any portion of the material layer, and then adding an acid and buffer solution to reduce the extract to a pH of approximately 6.9.

7. The process of making an antigen for intradermal use to determine if pregnancy exists comprising extracting the foetal layer of placental tissue free from any portion of the material layer with sodium hydroxide, separating the extract, and then neutralizing the extract with potassium phosphate and hydrochloric acid.

8. The process of making an antigen for intradermal use to determine if pregnancy exists comprising extracting the foetal layer of human placental tissue free from any portion of the maternal layer with one-tenth normal sodium hydroxide (NaOH), and then adding an acid and buffer solution of potassium phosphate ($KH_2PO_4$) and hydrochloric acid (HCl) to reduce the extract to a pH of substantially 6.9.

9. An antigen to determine if pregnancy exists comprising an extract of the foetal layer of mammalian placental tissue free from any portion of the maternal layer, said extract being adapted for intradermal injection, which extract contains a specific foetal embryonic protein homologous to the specific foetal embryonic protein of a pregnant mammalian and which produces a skin reaction by pseudopod formation when the said antigen is injected intradermally in a pregnant female mammalian.

10. An antigen to determine if pregnancy exists comprising an extract of the foetal layer of mammalian placental tissue free from any portion of the maternal layer, said extract being adapted for intradermal injection, which extract contains a specific foetal embryonic protein homologous to the specific foetal embryonic protein of a pregnant mammalian and which produces a skin reaction by pseudopod formation when the said antigen is injected intradermally in a pregnant female mammalian, said placenta being a placenta from a born female.

BENJAMIN GRUSKIN.